L. DE CORN.
Preserving Butter.
No. 9,167.  Patented Aug. 3, 1852.
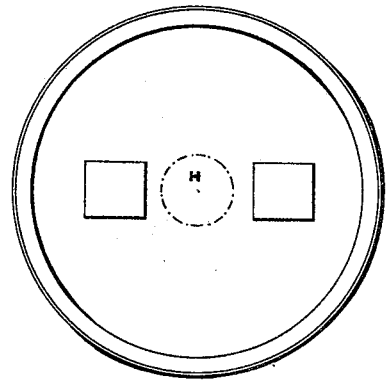
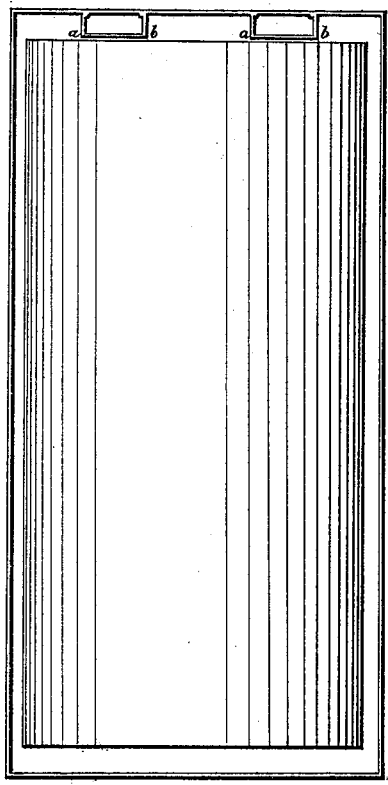

UNITED STATES PATENT OFFICE.

LOUIS DE CORN, OF CINCINNATI, OHIO.

COMPOSITION FOR PRESERVING BUTTER.

Specification of Letters Patent No. 9,167, dated August 3, 1852.

*To all whom it may concern:*

Be it known that I, LOUIS DE CORN, of Cincinnati, State of Ohio, have invented a new and Improved Mode of Preserving Fresh Butter, Salted or Not, for Any Length of Time; and I do hereby declare that the following is a full and exact description thereof, reference being had to the accompanying drawing and to the letters of reference marked thereon.

By my process, any quantity of butter can be preserved indefinitely fresh—I mean, can be preserved always fresh for any length of time.

The drawing represents the cut of a cylindrical tin box, by a plan passing by its axis; the cut butter is seen yellow, the water blue, the cut tin box brown.

Let us suppose the box open. I introduce the butter in the box with a mold which must be a cylindrical one, smaller than the tin box, the cylindrical piece of butter being set so in the tin box a place is left empty between the butter and the tin, all around.

I fill the empty place with water which contains in dissolution some iodid of potassium, about a quarter of a dram for a half pint of water. As soon as the box is filled with that water, the butter rises by its own specific density and floats. Then I fix the superior base of the cylindrical tin box, (I mean the cover) and I solder it. This superior cover has two small pieces of tin (a b) (a b) the purpose of which is to keep the butter from being in contact with the tin as much as possible: for the butteric acid by attacking the tin injures the butter. The cylindrical piece of butter stays in the box as it is seen in the drawing. It is in contact with the tin, only by two small stops (a b) (a b). Then I fill up the box with the water that I have mentioned above, by a small hole H, which is done on purpose in the middle of the cover. After that I close the hole with a small piece of tin and I solder it completely. By doing so the butter is preserved always fresh, as good as the first day, for any length of time.

To know if this process is successful, it is sufficient to place the boxes at the temperature of summer heat, which is the most favorable to the combination of butter with the oxygen of the air or of that which is in dissolution in water. If after seven or eight days of that artificial summer the butter is found fresh and good, in the boxes, this process must be declared perfect. A room always kept at the temperature above said by a stove; or a barrel filled with water kept always at the same temperature of 85 or 90 degrees Fahrenheit, will furnish the artificial summer.

It is not necessary to say that the salted butter could be preserved by that process as well as the fresh one, for iodid is the body, which gives the antiseptic propriety to the sea salt.

What I claim as my invention and desire to secure by Letters Patent is—

The preservation of fresh butter for any length of time, as herein described, using for that purpose the aforesaid chemical compound or its equivalent substantially in the manner and for the purpose set forth.

L. DE CORN.

Witnesses:
I. K. GLENN,
E. F. ADAMS.